Patented Mar. 28, 1939

2,151,839

UNITED STATES PATENT OFFICE 2,151,839

PROCESS OF PRODUCING RUBBER HYDROCHLORIDE

Giles B. Cooke, Baltimore, Md., assignor to Crown Cork & Seal Company, Inc., Baltimore, Md., a corporation of New York No Drawing. Application March 30, 1937, Serial No. 133,923

2 Claims. (Cl. 260—111)

The present invention relates to the production of rubber hydrochloride which is useful as a coating, or covering material, particularly in connection with closures and linings for receptacles.

While it is known to make rubber hydrochloride by reacting rubber with prepared hydrogen chloride, such processes have the objection that expensive and intricate compressing and drying equipment for hydrogen chloride are required. In addition, previous methods have required and recommended that the hydrogen chloride gas be furnished in excess of that theoretically necessary. This is both expensive and generally objectionable, since any appreciable excess is to be avoided, because of the necessity of resorting to subsequent neutralization.

Briefly stated, the present invention includes (1) a quantitative reaction whereby dry hydrogen chloride is produced and in the presence of the rubber, and (2) liberation of the hydrogen chloride in a controlled manner so that reaction thereof with the rubber takes place substantially completely. In this manner, the hydrogen chloride is molecularly dispersed as formed in a rubber solution, and is immediately available for reaction with the rubber. The process, moreover, results in the formation of a valuable chemical product, namely, an ester or esters which can be recovered. By reason of the quantitative reaction, and the control to which the process is susceptible, substantially uniform and constant results are obtained. This is very important, for example, where the rubber hydrochloride is to be used as a wrapping material or as a spotting material for crown closures or as a lining for containers, such as paper and metal cans.

In carrying out the invention, the raw rubber in any preferred concentration and in a suitable solvent, such as benzene, toluene and solvent naphtha, has added to it in the reaction vessel, a controlled amount of one of the acid chlorides, and thereafter an alcohol is added in controlled amounts. This is the preferable procedure, and by controlling (a) the temperature, and (b) the quantity and rate of addition of the alcohol, the amount of dry hydrogen chloride evolved and its speed of liberation can be nicely regulated to assure that substantially all of the hydrogen chloride will enter into the reaction with the rubber. It is possible that the reaction taking place between the acid chloride and the alcohol catalyzes the reaction between the hydrogen chloride and the rubber.

Substantially any acid chloride and any alcohol may be used for the production of the dry hydrogen chloride. By acid chlorides, I mean preferably organic chlorides of which acetyl chloride, benzoyl chloride, phenylacetyl chloride, paranitrolbenzoyl chloride, and succinyl chloride are examples. Typical examples of aliphatic and aromatic alcohols which are employed, are ethyl alcohol, butyl alcohol, isopropyl, tertiary butyl, polyhydric alcohols such as ethylene glycol, phenylmethyl, and phenylethyl alcohols.

*Example 1*

As one example of the process, 100 parts of rubber-benzene solution containing 16.6% rubber is mixed with 25 parts of acetyl chloride, and then 20 parts of ethyl alcohol is slowly introduced over a three hour period. The mass is constantly agitated and the temperature maintained at 35 to 40° F. so as to control the formation of the dry hydrogen chloride, it being understood that the acetyl chloride reacts violently with ethyl alcohol. By gradually adding the alcohol, and controlling the temperature so that the reaction is somewhat retarded, substantially all of the dry hydrogen chloride liberated reacts with the rubber. The materials are left standing over night and then more alcohol is added, and if no further evolution of hydrochloric acid is observed, this indicates that the reaction between the acid chloride and the alcohol is complete. The benzene and ester, i. e., ethyl acetate, are fractionally distilled off and the rubber hydrochloride purified. The product so prepared assays 21.8 parts of rubber hydrochloride.

*Example 2*

As a further example, the process is carried out as above, using 35 parts of butyl alcohol which is added slowly over a three hour period with the temperature maintained at substantially 45 to 50° F. The yield assays substantially 22 parts rubber hydrochloride after the solvent and ester have been removed.

*Example 3*

The process is also followed as above, using 40 parts benzoyl chloride and 35 parts butyl alcohol added slowly over a three and a half hour period with the temperature maintained at 100 to 110° F. The yield assays substantially 25 parts rubber hydrochloride containing some ester.

*Example 4*

The process is also followed using 50 parts of paranitrobenzoyl chloride, 60 parts of benzene to dissolve the chloride, and 20 parts of ethyl alcohol, which latter is added over a two hour period with the temperature kept at 100 to 110° F. The yield assays 27.5 parts rubber hydrochloride and 48 parts crude ester (91% theoretical).

Example 5

As a further example following the process, 25 parts succinyl chloride is added to the rubber and 20 parts ethyl alcohol added slowly over a two and a half hour period, and the reaction carried out at substantially room temperature. The product assays 24 parts rubber hydrochloride.

Example 6

As another example following the process, 50 parts phenylacetyl chloride is employed with 25 parts of additional benzene to act as a solvent, and there is added 20 parts ethyl alcohol over a two and a half hour period. The reaction is conducted at a temperature of about 45 to 50° F. An assay of the product shows substantially 24 parts of rubber hydrochloride containing some ester.

It will be observed that in each of the above examples, the 100 parts of rubber benzene solution containing 16.6% rubber yielded about 24 parts of pure rubber hydrochloride. This is equivalent to about 30% chlorine in the rubber. As explained, the rubber benzene solution is constantly stirred or agitated during the formation of the hydrochloric acid, i. e., during the hydrolysis of the acid chloride by the alcohol. The temperature, as will be noted, varies with the combination of acid chloride and alcohol employed. It is desirable to use the lowest temperature at which hydrolysis of the acid chloride by the alcohol proceeds steadily and at which evolution of hydrogen chloride is slow enough to prevent any substantial quantity of the hydrochloric acid from escaping. It will be noted that where acetyl chloride and ethyl alcohol are used, the temperature is maintained between 35 and 40° F. because of the violence of the reaction between these two chemicals. On the other hand, when paranitrolbenzoyl chloride and ethyl alcohol are used, the temperature is maintained between 100 and 110° F. in order to make hydrolysis proceed steadily and produce hydrochloric acid slowly; again where ethyl alcohol and benzoyl chloride are used, a temperature of about 100 to 110° F. is maintained.

While I have referred to the separation of the ester and solvent, e. g., benzene, by distillation, for instance in Example 1, it is to be understood that the ester may also be recovered by fractional crystallization as in the case of Example 4.

Relative to the esters produced, for example, when benzoyl chloride and ethyl alcohol are reacted, there is formed hydrogen chloride and ethyl benzoate. This ester sells for substantially twice the price of pure benzoyl chloride and 100 pounds of the chloride will produce 107 pounds of the ester. Thus, the reaction, in addition to constituting an efficient process of making rubber hydrochloride, also results in the production of a valuable ester by-product.

While I have referred to a rubber solution having 16.6% of rubber, it is to be understood that such concentration may be varied as desired.

Furthermore, in some of the examples, it will be noted that the assays disclose the presence of some ester in addition to the rubber hydrochloride. The presence of the ester is, in many cases, very desirable, in that it will act as a plasticizer.

As explained above, the reaction between the acid chloride and the alcohol taking place in the presence of the rubber solution assures very complete molecular dispersion of the hydrogen chloride as formed, and hence practically all of the gas is reacted with the rubber. It is this very complete dispersion obtained by the formation of the hydrogen chloride in the presence of the rubber solution which assures constant and uniform results and enables a controlled quantitative reaction to be carried out without the necessity of mechanical equipment or the use of excess amounts of the hydrogen chloride.

The invention is subject to considerable modification, but such changes are considered to be comprehended within the scope of the appended claims.

I claim:

1. The process of making rubber hydrochloride by reacting an organic acid chloride and an alcohol in the presence of a rubber solution which comprises dispersing the reagents in the rubber solution, reacting the reagents to form a uniform dispersion of hydrogen chloride in the solution, and reacting the hydrogen chloride as liberated, with the rubber.

2. The process of making rubber hydrochloride by reacting an organic acid chloride and an alcohol in the presence of a rubber solution which comprises dispersing the reagents in the rubber solution, reacting the reagents to form a uniform dispersion of hydrogen chloride in the solution, reacting the hydrogen chloride as liberated, with the rubber, and recovering the ester formed by the reaction.

GILES B. COOKE.